(12) United States Patent
Jang et al.

(10) Patent No.: US 12,294,279 B2
(45) Date of Patent: May 6, 2025

(54) MOTOR

(71) Applicants: HYUNDAI MOTOR COMPANY, Seoul (KR); KIA CORPORATION, Seoul (KR)

(72) Inventors: Hyung Kwan Jang, Uijeongbu-si (KR); Hoo Dam Lee, Seongnam-si (KR); Gyeong Sik Choe, Seoul (KR); Byung Ho Min, Suwon-si (KR); Tae Gyu Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 233 days.

(21) Appl. No.: 18/075,235

(22) Filed: Dec. 5, 2022

(65) Prior Publication Data
US 2023/0275501 A1    Aug. 31, 2023

(30) Foreign Application Priority Data

Feb. 25, 2022   (KR) .......................... 10-2022-0024740

(51) Int. Cl.
*H02K 55/04*    (2006.01)
(52) U.S. Cl.
CPC .................................. *H02K 55/04* (2013.01)

(58) Field of Classification Search
CPC .. H02K 3/00; H02K 3/02; H02K 3/04; H02K 3/12; H02K 3/28; H02K 3/47; H02K 19/00; H02K 19/02; H02K 19/04; H02K 19/10; H02K 19/12; H02K 19/26; H02K 21/04; H02K 21/042; H02K 55/00; H02K 55/02; H02K 55/04; H02K 23/58
See application file for complete search history.

(56) References Cited

U.S. PATENT DOCUMENTS 4,363,986 A * 12/1982 Joho ........................ H02K 7/04
310/194

FOREIGN PATENT DOCUMENTS

JP       2010022185 A  *  1/2010  ............. H02K 19/26
KR       101676157 B1     11/2016

* cited by examiner

*Primary Examiner* — Tran N Nguyen
(74) *Attorney, Agent, or Firm* — Lempia Summerfield Katz LLC

(57) ABSTRACT

A motor that is a wound field synchronous motor and includes a rotor and a stator. The rotor includes a plurality of winding portions configured to have a preset cross-section for generating a uniform effective air gap. The winding portions are spaced from each other a predetermined distance apart along a circumferential direction of the rotor. A field coil is wound around the plurality of winding portions.

13 Claims, 4 Drawing Sheets

FIG. 1A – Prior Art
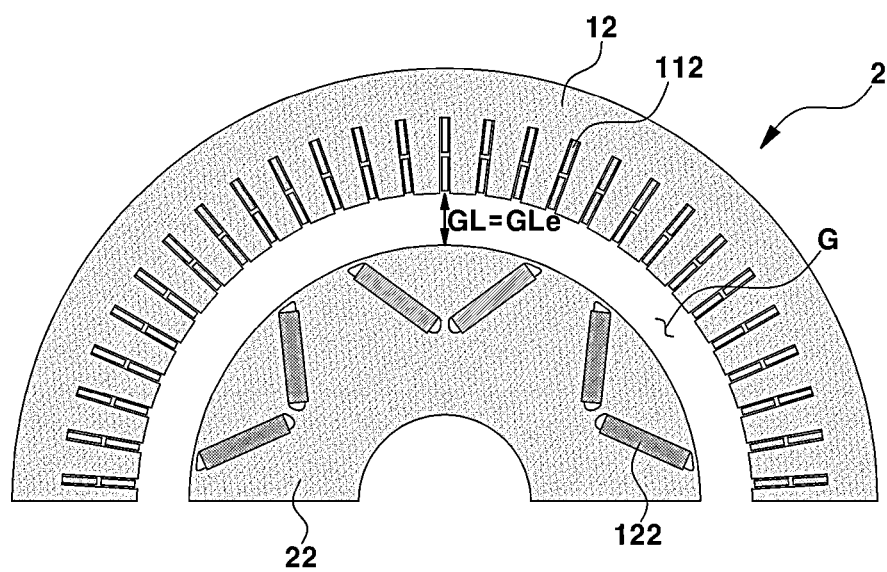
FIG. 1B – Prior Art
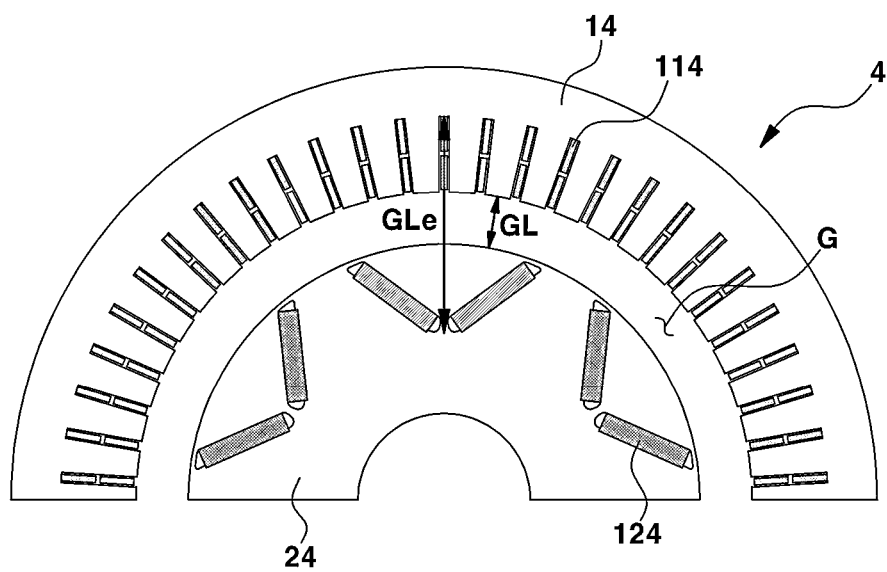

FIG. 1C – Prior Art
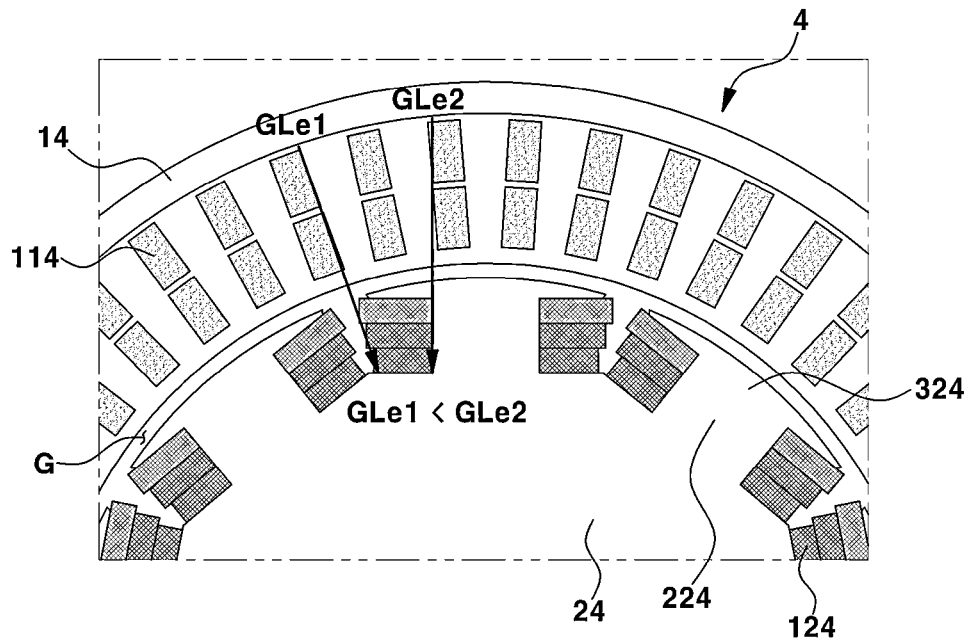
FIG. 2
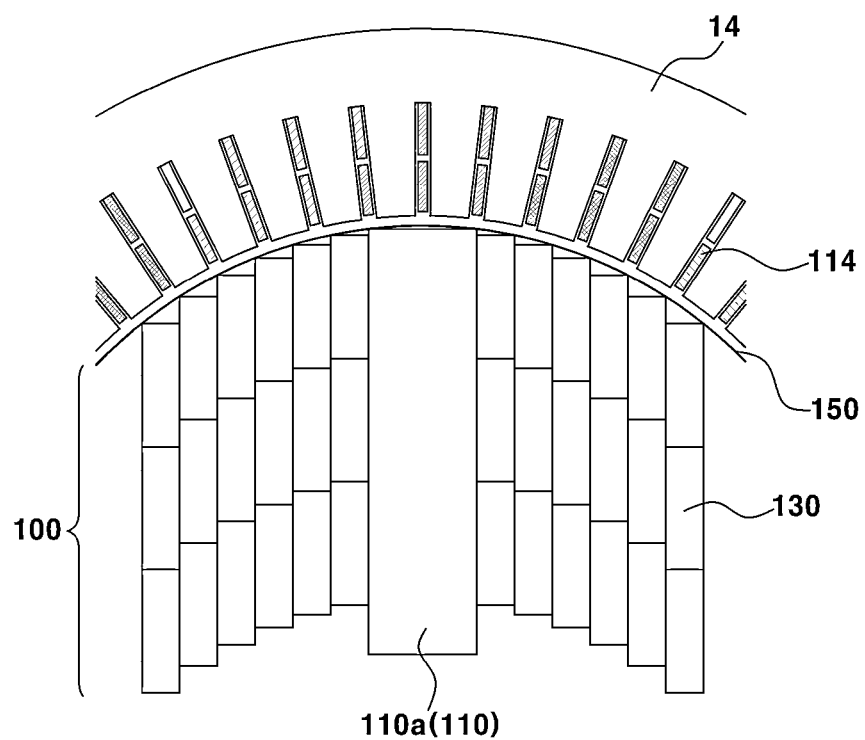

MOTOR

CROSS-REFERENCE TO RELATED APPLICATION

This application claims under 35 U.S.C. § 119(a) the benefit of priority to Korean Patent Application No. 10-2022-0024740 filed on Feb. 25, 2022, the entire contents of which are incorporated herein by reference.

BACKGROUND

(a) Technical Field

The present disclosure relates to a motor and, more particularly, to a wound field synchronous motor.

(b) Background Art

Electric vehicles, including hybrid electric vehicles, are partially or totally driven by a motor instead of an internal combustion engine in the related art. Interior permanent magnet synchronous motors (IPMSM) are used as motors for these electric vehicles, which widely use permanent magnets. The IPMSM has high-efficiency and high-output features.

However, the advantage of a wound field synchronous motor (WFSM) is that the cost of rare earth elements used as permanent magnets can be reduced and that a magnetic field of a rotor can be controlled with electric current. For this reason, the use of WFSMs is also attracting attention.

The above information disclosed in this Background section is only to enhance understanding of the background of the disclosure. Accordingly, the Background section may include information that does not form the prior art that is already known to a person of ordinary skill in the art.

SUMMARY

The present disclosure has been made in efforts to solve the above-mentioned problems. An object of the present disclosure is to provide a motor that has a uniform effective air-gap length.

The present disclosure is not limited to the above-mentioned object. Objects not mentioned herein should be clearly understood from the following description by a person of ordinary skill in the art to which the present disclosure pertains.

An embodiment of the present disclosure is configured as follows to achieve the objects of the disclosure as mentioned above and to perform a characteristic function thereof.

According to an aspect of the present disclosure, a wound field synchronous motor includes a rotor and a stator. The rotor includes a plurality of winding portions configured to have a preset cross-section for generating a uniform effective air gap. The winding portions are spaced from each other by a predetermined distance apart along a circumferential direction of the rotor; and a field coil wound around the plurality of winding portions.

According to an embodiment of the present disclosure, a motor is provided having a uniform effective air-gap length.

The present disclosure is not limited to the above-mentioned advantageous effect. Other advantageous effects not mentioned should be clearly recognized, from the following description by a person of ordinary skill in the art.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein:

FIG. 1A is a cross-sectional view illustrating half of a core-type motor that includes an electrical steel sheet;

FIG. 1B is a cross-sectional view illustrating half of a coreless-type motor that does not include the electrical steel sheet;

FIG. 1C is a cross-sectional view illustrating one portion of the coreless-type motor;

FIG. 2 is a cross-sectional view illustrating one portion of a motor according to an embodiment of the present disclosure;

DETAILED DESCRIPTION

Figure 3:
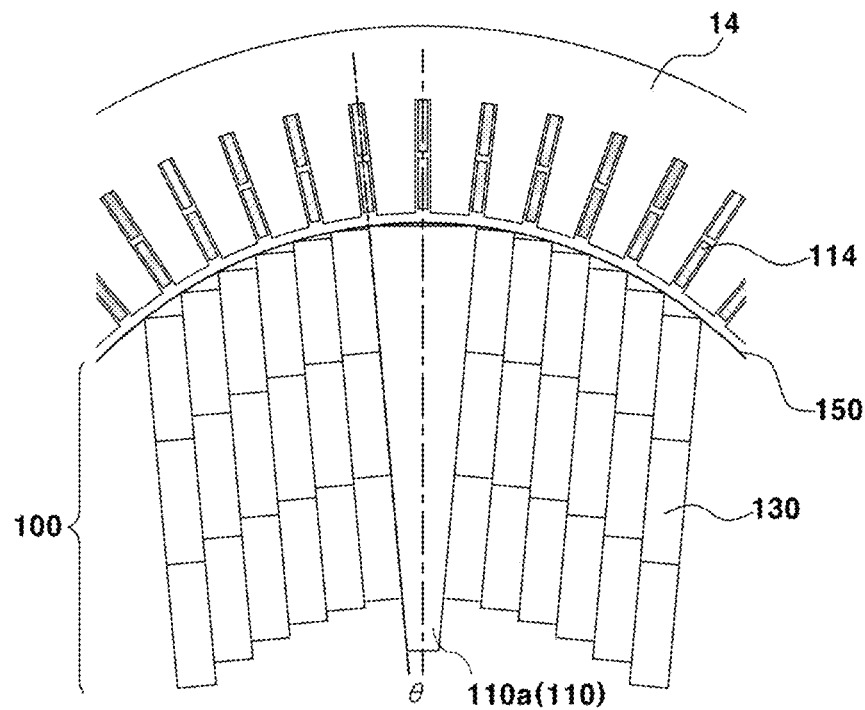
FIG. 3 is a cross-sectional view illustrating one portion of a motor according to an embodiment of the present disclosure.

Embodiments of the present disclosure are described below only in a manner in terms of specific structures and functions. The embodiments of the present disclosure may be practiced in various forms without departing from the nature and gist of the present disclosure. The present disclosure should not be construed as being limited to the embodiments described in the specification. All alterations, equivalents, and substitutes that are included within the technical idea of the present disclosure should be understood as falling within the scope of the present disclosure.

In the present specification, the terms first, second, and so on are used to describe various constituent elements, but the various constituent elements are not limited to those terms. Those terms are used only to distinguish one similar constituent element from another. For example, a first constituent element may be termed a second constituent element without departing from the scope of each claim that defines the present disclosure. Likewise, the second constituent element may also be termed the first constituent element.

It should be understood that a constituent element, when referred to as being "coupled to" or "connected to" a different constituent element, may be directly coupled to or directly connected to the different constituent element with or without an intervening constituent element being present in between. In contrast, it should be understood that a constituent element, when referred to as being "directly coupled to" or "directly connected to" a different constituent element, may be directly coupled to or directly connected to the different constituent element without an intervening constituent element being present therebetween. Expressions such as "between" and "directly between," and "adjacent to" and "directly adjacent to" for describing a relationship between constituent elements should be construed in the same manner.

Throughout the specification, the same reference numerals refer to the same elements. The terms used in the present specification are for the purpose of describing the embodiments and are not intended to limit the present disclosure. Unless specified otherwise throughout the present specification, a singular noun or a singular noun phrase may have a plural meaning. The terms "comprise" and/or "comprising" are intended to indicate that a named constituent element, step, operation, or element is present, without precluding the presence or addition of one or more other constituent elements, steps, operations, or elements.

Embodiment of the present disclosure are described in detail below with reference to the accompanying drawings.

As is well known, motors include a stator and a rotor. Motors are configured in such a manner that the rotor is rotated by electromagnetic interaction between the stator and the rotor. As described above, types of motors include a permanent magnet synchronous motor (PMSM) in which a permanent magnet is used and a wound field synchronous motor (WFSM) in which a field coil is wound around a rotor.

In the WFSM, a coil is used instead of a permanent magnet in order to generate magnetic flux in the rotor. Specifically, the magnetic flux around the field coil is generated by the coil wound around teeth of the rotor. Normally, in the case of the WFSM, the coil is wound around an electrical steel sheet, and the magnetic flux around the field coil that flows through the electrical steel sheet goes out through an air gap. However, a field coil made of a superconducting wire may be used to manufacture both a core-type motor that includes the electrical steel sheet and a coreless-type motor that does not include the electrical steel sheet. The coreless-type motor includes a non-magnetic material instead of the electrical steel sheet. Examples of the non-magnetic material may include but are not limited to plastic, stainless steel, copper, aluminum, and the like.

In the motor, the air gap formed between the stator and the rotor has a significant effect on the efficiency of the motor. Particularly, when an effective air-gap length is non-uniform, an air-gap magnetic flux having a low density is generated, which can cause a decrease in output.

FIG. 1A is a cross-sectional view illustrating half of the core-type motor 2 which includes the electrical steel sheet, a stator 12 and a rotor 22. Reference numerals 112 and 122 refer to a stator coil and a rotor coil, respectively, that are not described. In the core-type motor 2, an air-gap length (GL) of the air gap (G) is the same as an effective air-gap length (GLe).

However, as clearly illustrated in FIG. 1B, in the case of a coreless-type or slot-less motor 4 that includes a stator 14, which includes a stator coil 114 and which is formed of a non-magnetic material and a rotor 24, the air-gap length GL is only a length of a physical air gap. Due to magnetic properties, the effective air-gap length GLe is greater than the air-gap length GL. Since a field coil 124 is wound around the rotor 24, a distance between the end points of the magnetic flux is equal to the effective air-gap length GLe. In the case of the core-type motor, the magnetic flux flows through the electrical steel sheet, and magnetic flux leakage is small. However, in the case of the coreless-type motor, the magnetic flux penetrates a material having a relative permeability close to 1, so the magnetic flux leakage is relatively large.

In the case of the coreless-type motor, from an electromagnetic point of view, an effective air gap is present at a portion of the stator 12 that is close to the field coil 124 and the air gap G. As clearly illustrated in FIG. 1C, in the coreless-type motor, because the superconducting wire is bent, a wire is wound by using a bobbin 224, which makes it difficult to maintain a uniform effective air gap between the stator 14 and the rotor 24. In other words, the effective air-gap length GLe may be non-uniform (GLe1<GLe2) between each of the effective air-gap lengths GLe. Reference numeral 324 in FIG. 1C refers to a shoe that is not described. The shoe 324 functions to minimize torque ripple, cogging torque, and the like by minimizing magnetoresistance to the stator 14 and prevents the field coil 124 from being separated by a centrifugal force.

To deal with this problem, according to an embodiment of the present disclosure, there is provided a rotor for a motor that may maximize an air-gap magnetic flux density and a motor output by enabling the motor, particularly, the coreless-type motor, to have a uniform effective air-gap length.

To this end, according to an embodiment of the present disclosure, a winding portion around which the field coil is wound is configured to have a preset cross-section. Thus, the effective air gap length may be made uniform.

According to an embodiment of the present disclosure, a rotor 100 includes a winding portion 110 and a field coil 130.

The winding portion 110 is configured in such a manner that the field coil 130 is wound there around. A plurality of winding portions 110 are provided to be spaced apart a predetermined distance along a circumferential direction of the rotor 100. The field coil 130 is wound around the winding portion 110 according to an embodiment of the present disclosure, as is done around a bobbin 224 in the related art. However, the field coil 130 has a different shape and advantageous effect compared to the bobbin 224 in the related art. In other words, the winding portion 110 is configured to have a specific shape so that the motor has a uniform effective air gap. In an embodiment, the field coil 130 may be made of a superconducting wire. In some embodiments, the field coil 130 may be made of a normal conducting wire.

As illustrated in FIG. 2, according to some embodiments of the present disclosure, a winding portion 110a is configured to have a quadrangle-shaped cross-section. The cross-section here refers to a cross-section along a radial direction of the rotor 100. In addition, the winding portion 110a does not include the shoe 324 of the bobbin 224 in the related art. For this reason, the effective air-gap length GLe may be made more uniform. In some embodiments, the winding portion 110a may include a shoe. However, in order to make the effective air-gap length GLe uniform at an entire circumference of the motor, the shoe of the winding portion 110a, unlike the shoe 324 of the bobbin 224 in the related art, is configured to have a shape and a circumferential length that substantially corresponds to a curvature of the rotor 100.

With reference to FIG. 3, according to some embodiments of the present disclosure, the winding portion 110b is configured to have a substantially trapezoid- or fan-shaped cross-section. The cross-section here refers to a cross-section along the radial direction of the rotor 100. According to the present embodiment, the field coil 130 may be wound in such a manner that a curvature thereof is very close to the curvature of the rotor 100. For this reason, the air-gap magnetic flux density and the output may be improved by making the effective air-gap length GLe uniform.

The central angle $\theta$ of the winding portion 110 may be set to a magnitude at which the effective air-gap length GLe can be made uniform, based on a curvature or the like of the rotor 100. The field coil 130 may be wound in such a manner that the curvature of the field coil 130 is very close to the curvature of the rotor 100. The magnitude of the central angle $\theta$ should be selected considering the curvature of the rotor 100 and the bending property of the superconducting wire. In other words, the magnitude of the central angle $\theta$ that satisfies the condition that the inside of the superconducting wire remains intact should be selected. However, the bending property of the superconducting wire may vary from one superconducting wire to another.

The field coil 130 made of the superconducting wire, when wound, is subject to a limiting condition due to its bending property. However, due to a structure of the WFSM, a coil portion should be manufactured like a racetrack. In such a case, a coil portion may be somewhat bent according to the curvature of the rotor 100 and then may be wound.

According to an embodiment of the present disclosure, the rotor 100 may further include a jacket 150. The jacket 150 is configured to surround the rotor 100 or the winding portion 110 from radially outward. The jacket 150 may be provided in order to prevent the magnet coil 130 wound around the winding portion 110 from being separated from the winding portion. In some embodiments, the jacket 150 may be a taping member. The taping member may be formed of a material, such as glass fiber or carbon fiber, although it is not so limited. In some embodiments, the jacket 150 may be a sleeve. The jacket 150 may be formed of a non-magnetic material that has a low conductivity. In addition, it is desirable that the jacket 150 is formed of a material that has a high mechanical strength in order to prevent the field coil 130 from being separated.

According to an embodiment of the present disclosure, the rotor 100 may be a rotor for the WFSM and may be a rotor for the coreless-type motor. In the case where the bobbin 224 is omitted, the shape of the superconducting wire may be deformed due to counter torque. Therefore, it is more desirable that a superconducting field coil and an armature for low torque are manufactured without using the bobbin 224. In addition, a normal conducting wire in place of the superconducting wire may be applied to the field or armature.

Figure 4:
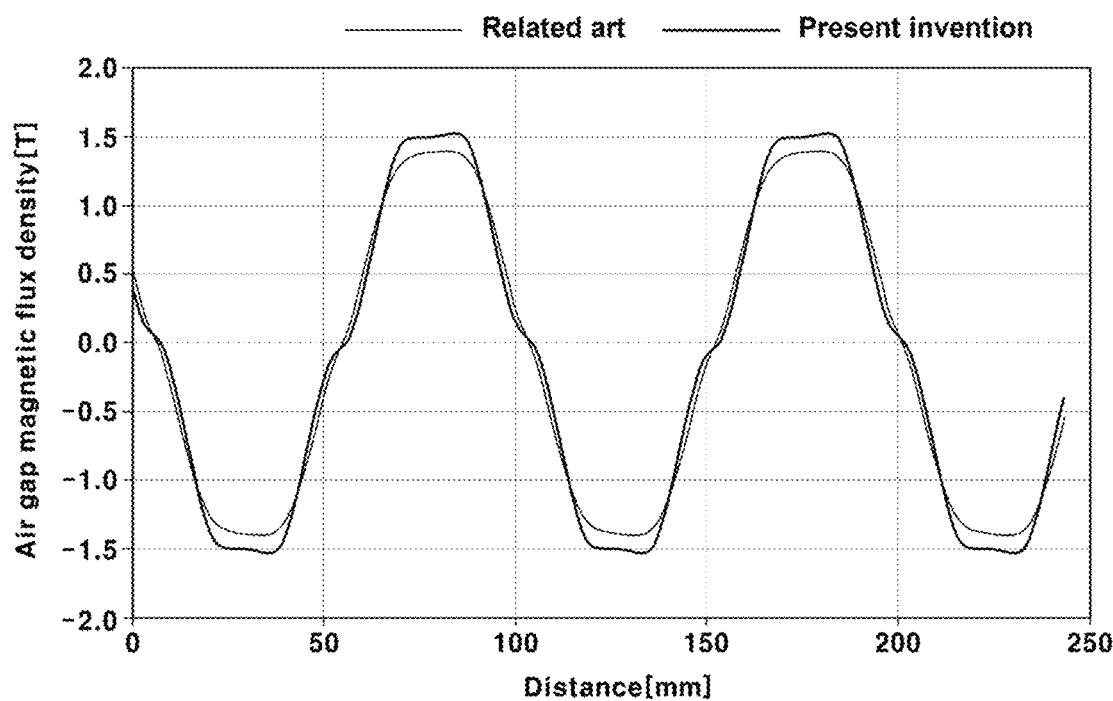
FIG. 4 is a graph showing a difference in air-gap magnetic flux density between an embodiment of the present disclosure and the related art.
Figure 5:
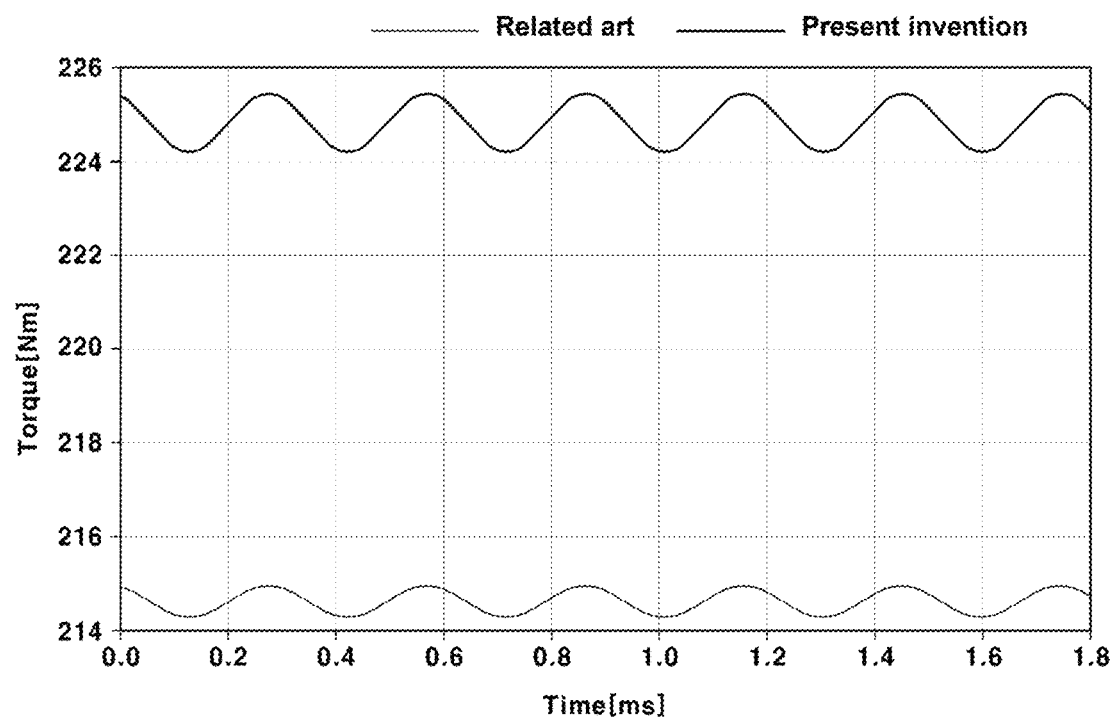
FIG. 5 is a graph showing a difference in output between an embodiment of the present disclosure and the related art.

As shown in FIGS. 4 and 5, the air-gap magnetic flux density and the output were acquired through finite-element analysis of the motor including the rotor according to the present disclosure. From FIGS. 4 and 5, it can be seen that the air-gap magnetic flux density and the torque were more improved by approximately 4.6% as compared to a motor in the related art.

The present disclosure is not limited to the embodiments described above and the accompanying drawings. It should be apparent to a person of ordinary skill in the art to which the present disclosure pertains that substitutions, modifications, and alterations are possible without departing from the technical idea of the present disclosure.

What is claimed is:

1. A motor comprising:
a rotor; and
a stator,
wherein the rotor includes
a plurality of winding portions configured to have a preset cross-section for generating a uniform magnetically effective air gap length, wherein the winding portions are spaced from each other a predetermined distance apart along a circumferential direction of the rotor, and
a field coil wound around the plurality of winding portions,
wherein the motor is a wound field synchronous motor, and
wherein the motor is a coreless-type motor.

2. The motor of claim 1, further comprising:
a jacket configured to surround the plurality of winding portions from radially outward of the rotor.

3. The motor of claim 2, wherein the jacket is formed of a non-magnetic material.

4. The motor of claim 1, wherein the preset cross-section is quadrangle-shaped.

5. The motor of claim 4, wherein each of the plurality of winding portions does not include a shoe.

6. The motor of claim 1, wherein the preset cross-section is substantially fan-shaped.

7. The motor of claim 6, wherein a magnitude of the central angle of each of the plurality of winding portions is determined based on a curvature of the rotor.

8. The motor of claim 1, wherein the field coil is made of a superconducting wire or a normal conduction wire.

9. The motor of claim 1, wherein the field coil is made of a superconducting wire.

10. The motor of claim 1, wherein the field coil is wound around each of the plurality of winding portions such that the uniform magnetically effective air gap length is uniform along a circumference of the rotor.

11. The motor of claim 10, wherein the field coil is wound around the plurality of winding portions such that a curvature thereof is substantially the same as a curvature of the rotor.

12. The motor of claim 11, wherein the field coil is bent such that the curvature thereof is substantially the same as the curvature of the rotor and then is wound around each of the plurality of winding portions.

13. The motor of claim 10, wherein each of the plurality of winding portions includes a shoe, and wherein the shoe is formed such that a curvature thereof is substantially the same as the curvature of the rotor.

* * * * *